United States Patent [19]
Wells

[11] 3,744,499
[45] July 10, 1973

[54] DENTAL FLOSS ROLL COMPRISING INTERCONNECTED PIECES EACH HAVING A PICK END

[76] Inventor: Richard L. Wells, 4503 N. 32nd St., Phoenix, Ariz. 85018

[22] Filed: Oct. 30, 1972

[21] Appl. No.: 301,963

[52] U.S. Cl. ............................ 132/92 A, 117/37
[51] Int. Cl. ............................................ A61c 15/00
[58] Field of Search .................. 132/91, 92 A, 93, 132/89; 117/37

[56] References Cited
UNITED STATES PATENTS

| | | | |
|---|---|---|---|
| 1,287,926 | 12/1918 | Ecaubert | 132/92 A |
| 2,522,794 | 9/1950 | Medof | 132/93 |
| 3,511,249 | 5/1970 | Baitz | 132/89 |

Primary Examiner—Louis G. Mancene
Assistant Examiner—Gregory E. McNeill
Attorney—Warren F. B. Lindsley

[57] ABSTRACT

Dental floss roll comprising interconnected pieces, each with a pick end having a degree of rigidity greater than the floss.

17 Claims, 6 Drawing Figures

PATENTED JUL 10 1973 3,744,499

DENTAL FLOSS ROLL COMPRISING INTERCONNECTED PIECES EACH HAVING A PICK END

BACKGROUND OF THE INVENTION

Dental disease is caused by the accumulation of microscopic germs (bacteria) on the teeth and gums. These germs, which are always present even in healthy mouths, mix with saliva to form a transparent, sticky coating called bacterial plaque. Bacterial plaque generates acid which attacks the teeth, generally in the tiny crevices near the gum line between the teeth and the gum, resulting in tooth decay, tender and bleeding gums, foul breath, etc. The presence of bacteria alone in a disorganized state produces no harmful effects. To disorganize the bacteria daily will greatly reduce, if not eliminate, dental disease.

FIELD OF THE INVENTION

Dental floss has been used to break up colonies of bacteria that gather at or near the gum line of the teeth. However, pieces of dental floss used haphazardly is not enough to completely disorganize the bacterial colonies found near the gum lines in all mouths since the gum line is not always penetrated by improper flossing. Further, a means is needed to aid in inserting the end of a piece of floss between teeth as well as penetrating of a piece of floss between teeth as well as penetrating pockets and other indentations not reached by pliable floss. Accordingly, each piece of floss needs a reinforced, resilient, firm or rigid end to aid the user in forcing the piece of floss between the teeth and in reaching all areas of the gum line.

DESCRIPTION OF THE PRIOR ART

Heretofore attempts have been made to fasten a pick end to a piece of floss. These attempts have been unsuccessful since the floss when fastened to the pick results in a pick end too large to pass between the teeth. Further the attachment of the floss to the pick end was usually too fragile to stand the tooth flossing activity. Still further, the problems existing in mass producing and merchandising make it difficult if not impossible to economically manufacture and package individual pieces of dental floss each with a pick end.

Therefore a need exists for a simple and inexpensive sanitary roll arrangement of a plurality of interconnected floss pieces each piece having a relatively reinforced or firm pick end that can be subdivided into its individual floss pieces when needed.

Since the purchasing public must not only be satisfied with the need of the product but must also be sold by the package within which it is contained, the dental floss roll must be packaged so that it sells itself, be easily handled by sales people and the buyer, and stimulates impulse buying.

SUMMARY OF THE INVENTIOn

In accordance with the invention claimed, a new and improved roll and method of packaging of dental floss are disclosed and claimed which comprises a continuous piece of floss which is thickened, reinforced, rendered resilient, firm or rigid periodically along its length to form pick ends. The floss between adjacent pick ends forms a contiguous piece with the pick ends so that if the floss was severed adjacent a common end of each piece the floss remaining attached thereto and the pick end would result in a usable tool for penetrating and flossing the teeth.

A plurality of dental floss pieces with pick ends are arranged in a continuous strip with each pick end in the roll being shaped or marked in a given manner to aid in removing it from the roll by the user.

It is, therefore, one object of this invention to provide a new and improved roll of dental floss formed in detachable pieces of recognizable lengths having a pick end at one end of each piece.

Another object of this invention is to provide a new and improved contiguous roll of dental floss wherein the roll is thickened, firmed up or rendered more rigid than the floss at periodic places along the roll.

A further object of this invention is to provide a new and improved package of dental floss, the floss of which is formed into recognizable pieces of given lengths which can be easily severed at the end of a given length resulting in the dispensing of a floss piece with a resilient pick end.

A still further object of this invention is to provide a new and improved package of floss pieces each having a pick end which are arranged in strip form with each piece detachably connected to the following piece.

A still further object of this invention is to provide a new and improved method of packaging pieces of dental floss.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing, in which.

DESCRIPTION OF THE PREFERRED EMBODIMENT

Figure 1:
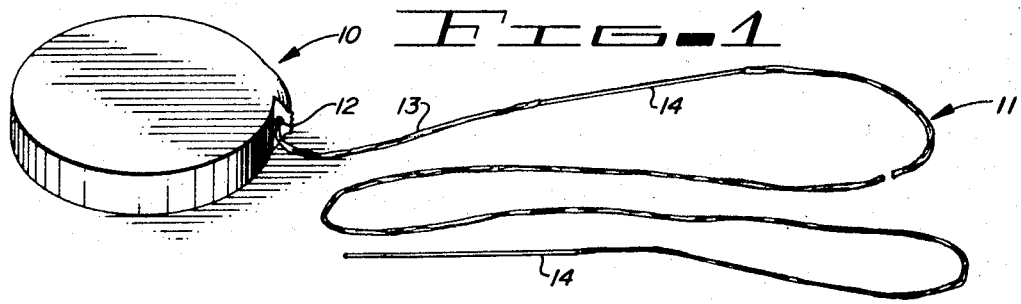
FIG. 1 is a perspective view of a dental floss dispenser of a continuous roll or strip of floss pieces each having a pick end.

Referring more particularly to the drawing by characters of reference, FIG. 1 discloses a dental floss dispenser 10 having a piece 11 of dental floss extending outwardly thereof through an aperture 12. The dental floss comprising piece 11 is formed in a roll or bobbin configuration on a suitable supporting core so that it may be easily pulled from the dispenser.

The dental floss may be of the usual nylon, cotton or other material found in the market place of a strip or round configuration. This floss may be waxed or not and formed of recognizable pieces of suitable lengths all formed in a contiguous roll or strip form. Each piece may be, for example, 6 to 18 inches in length. It should be recognized that all though it is contemplated to use and sell packages of floss in roll form with recognizable piece lengths of the above sizes, each piece may be of any similar or different length and fall with the scope oF this invention.

As shown and disclosed the roll or strip of dental floss comprises a plurality of pieces 13 each having a reinforced or thickened end forming a pick 14 for the dental floss piece 13. This pick end of the dental floss piece is intended to make it easy to insert the floss between the teeth preferably at the gum line, thereby acting as a leader for the dental floss strip. Heretofore, the dental floss was affixed to a floss leader by wrapping the floss at least partly around the leader and hooking it to or under a distortion of the pick. This was unsatisfactory since it added to the thickness of the pick. Further, the pick was too large to pass through the natural cavities between the teeth.

Therefore, a need exists for the disclosed and claimed article since it not only threads the floss between the teeth by providing a firm body at one end of the floss, but the pick end may also be used in removing the bacterial plaque in the manner of a toothpick from certain areas of the teeth. The pick, by being of a small over-all configuration, may be used to penetrate the sulcus between the gum and tooth at a particular place to disturb the colonies of bacterial plaque in areas where normal flossing of the teeth around the gum line will be difficult to accomplish.

In order to manufacture economically pieces of floss each with a pick end, the floss pieces must be formed in a roll or strip form. One way to accomplish this is to form the pick end portion of each strip during or immediately after the dental floss strip is formed. This may be accomplished by reinforcing a part of the floss at periodic points or areas along the strip by thickening the floss. This reinforcing may be material of the same thing that the strip of floss is made of such as nylon or cotton or the strip may be reinforced by the application of a wax or plastic coating of a sufficient amount to firm up the floss at that point. Such firming up of the floss renders that portion of the floss sufficiently resilient or firm so that it may form a leader for the associated strip of dental floss.

Figure 2:
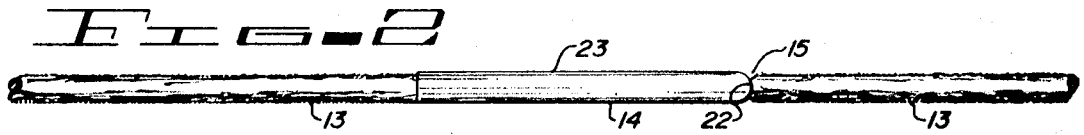
FIG. 2 is an enlarged fragmentary view of a piece of the dental floss shown in FIG. 1 illustrating the floss strip being notched at one severing point on the strip.
Figure 3:
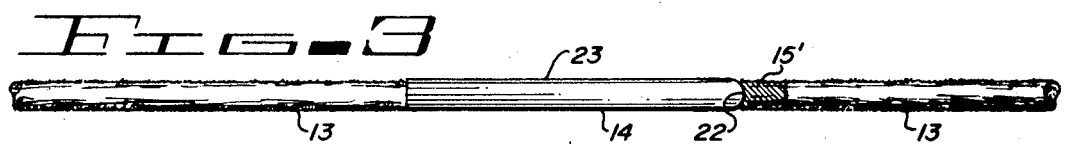
FIG. 3 is an enlarged fragmentary view of a modification of the piece of dental floss shown in FIG. 2 wherein the floss is color coded to illustrate the severing point.

In order to identify the area of the strip of dental floss at which it should be severed from the roll or strip, the floss may be perforated, reduced in cross sectional area or necked down at a point 15 immediately adjacent the end of the pick 14, as shown in FIG. 2. The strip also may be color coded at 15' as shown in FIG. 3 indicating the area for severing the strip. Although two ways of indicating the place for severing the section of dental floss has been disclosed, any other suitable way may be utilized. Of course no marking, perforation or the like may be needed since the pick end of each section of the roll or strip of floss may be readily recognized.

Figure 4:
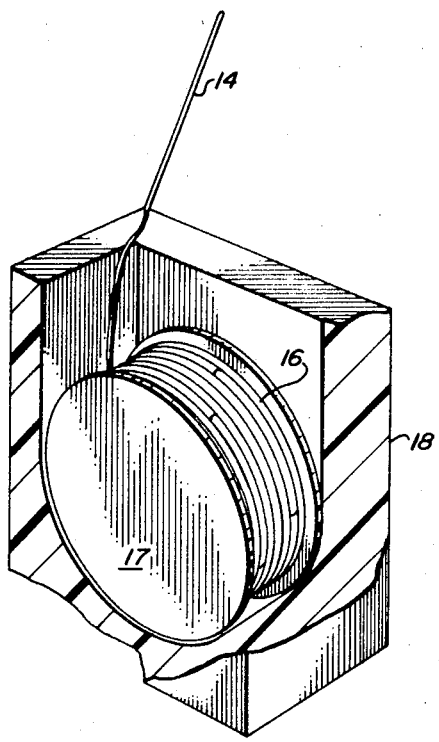
FIG. 4 is a partial view of a modification of the dispenser shown in FIG. 1 illustrating the roll configuration of the floss.
Figure 5:
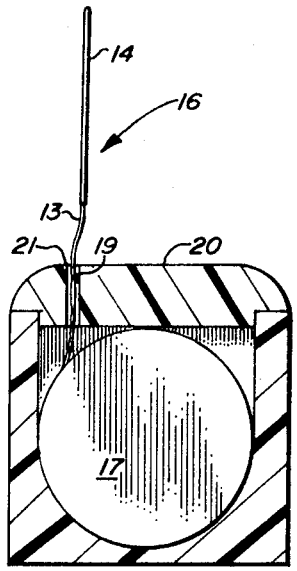
FIG. 5 is a reduced view of the structure shown in FIG. 4 with a cover embodying a dispensing passageway therein.
Figure 6:
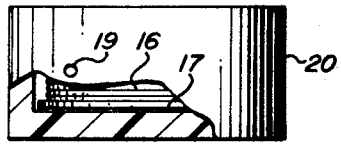
FIG. 6 is a top view of FIG. 5 with a portion broken away to show the floss roll.

FIGS. 4, 5 and 6 illustrate that a roll of floss 16 comprising a plurality of interconnected sections of the type disclosed in FIGS. 1, 2 and 3 may be mounted on a spool 17 and loosely inserted in a hollow container 18. The floss may be fed out of an aperture or passageway 19 in its cover 20. At the mouth 21 of the passageway 19 a knife or cutting edge (not shown) may be provided for severing the floss at a pick end of a floss piece in the usual manner of all floss dispensers.

Although the pick ends of each section of floss may be of any suitable configuration, FIGS. 2 and 3 illustrate that the enlarged portion of the dental floss called its pick end 14 is provided with a blunt end 22 having the shape of a frustum of a cone which tapers into an elongated portion 23 of a cylindrical configuration having a diameter of approximately 1.5 millimeters and a length of approximately 35 millimeters.

If the dental floss is of a strip configuration as shown in the copending U.S. Pat. application, Ser. No. 277,340, filed Aug. 2, 1972 by Richard L. Wells, the pick end may have a rectangular cross-sectional configuration.

In all of the structures disclosed and claimed, it is intended to cover floss pieces or strips as shown in FIG. 1 of a convenient length for flossing the teeth wherein each strip is provided at one end with a pick molded thereto. This floss piece or strip, together with its pick end, is intended to be used once and then thrown away. The pick end of the article is small enough to pass through the crevices between the teeth at the gum line so that the floss then may be drawn around the teeth at the gum line for disturbing the bacterial plaque by a wiping, rubbing action, as heretofore explained.

It should be recognized that if material such as plastic is molded to the dental floss to firm up a portion thereof, the material must melt at a lower temperature than the material of the dental floss.

Although but a few embodiments of the present invention have been illustrated and described, it will be apparent to those skilled in the art that various changes and modifications may be made therein without departing from the spirit of the invention or from the scope of the appended claims.

What is claimed is:

1. A continuous arrangement of dental floss articles for use in removing bacterial plaque from around the gum line of the teeth comprising:
   a roll of dental floss,
   said roll comprising identifiable detachable sections,
   each of said sections comprising a reinforced portion forming a pick end when said section is removed from the roll,
   said reinforced portion rendering that portion of the section more rigid than the remaining portion of the floss in said section so that it may function as a leader for threading the floss between the teeth.

2. The continuous arrangement of dental floss articles set forth in claim 1 wherein:
   said reinforced portion comprises a coating of material to the floss to render it firm.

3. The continuous arrangement of dental floss articles set forth in claim 1 wherein:
   said reinforced portion comprises a coating of material rendering it resilient.

4. The continuous arrangement of dental floss articles set forth in claim 3 wherein:
   said material comprises plastic.

5. The continuous arrangement of dental floss articles set forth in claim 2 wherein:
   said material comprises a coating of wax.

6. The continuous arrangement of dental floss articles set forth in claim 1 wherein:
   said pick end comprises a frustrum of a cone tapering from a blunt end to a cylindrical portion.

7. The continuous arrangement of dental floss articles set forth in claim 1 wherein:
each reinforced portion is reduced at one end thereof for aiding in severing that portion from the roll of dental floss.

8. The continuous arrangement of dental floss articles set forth in claim 1 wherein:
the floss adjacent one end of each of the reinforced portions on the roll is color coded for identifying the area for severing the article from the roll of dental floss.

9. A dispenser for dental floss sections comprising:
a hollow container for holding a spool of dental floss,
said container comprising a dispensing passageway for floss movement from said spool outwardly of said container,
a spool mounted within said container for dispensing floss therefrom,
a roll of dental floss wound around said spool,
said roll comprising identifiable detachable sections,
each of said sections comprising reinforced portions forming a pick end when said section is removed from the roll,
said reinforced portion rendering that portion of the section more rigid than the remaining portion of the floss in said section so that it may function as a leader for threading the floss between the teeth.

10. The dispenser set forth in claim 9 wherein:
said reinforced portion comprises a coating of material applied to the floss to render it firm.

11. The dispenser set forth in claim 9 wherein:
said reinforced position comprises a coating of material rendering it resilient.

12. The dispenser set forth in claim 11 wherein: said material comprises plastic.

13. A method of forming a continuous arrangement of dental floss articles comprising the steps of:
forming a continuous roll of dental floss, and periodically reinforcing said floss to render predetermined portions of the floss more rigid than the remainder of the floss.

14. The method of forming a continuous arrangement of dental floss articles set forth in claim 13 in further combination with the step of:
shaping each reinforced portion to form a tapered pick end for the article when the reinforced portion and a contiguous portion of floss is detached from the roll.

15. The method of forming a continuous arrangement of dental floss articles set forth in claim 13 wherein:
the roll of floss is periodically reinforced by an added material to render that portion resilient.

16. The method of forming a continuous arrangement of dental floss articles set forth in claim 13 wherein:
the roll of floss is coated at predetermined areas with plastic to form pick ends when the reinforced portion and a contiguous portion of floss is detached from the roll.

17. The method of forming a continuous arrangement of dental floss articles set forth in claim 13 in further combination with the step of:
marking the roll adjacent one end of each of said reinforced portions for identifying a severing point for the articles from the roll.

* * * * *